(12) United States Patent
Banerjee et al.

(10) Patent No.: US 10,097,600 B2
(45) Date of Patent: *Oct. 9, 2018

(54) REAL-TIME STATISTICAL ANALYSIS ON HIGH SPEED STREAMING DATA

(71) Applicant: International Business Machines Corporation, Armonk, NY (US)

(72) Inventors: Suchismita Banerjee, Bangalore (IN); Girish G. Kurup, Bangalore (IN); Ashutosh Misra, Bangalore (IN); Niranjan Vaish, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,635

(22) Filed: Jul. 21, 2016

(65) Prior Publication Data

US 2017/0093656 A1   Mar. 30, 2017

Related U.S. Application Data

(63) Continuation of application No. 14/868,495, filed on Sep. 29, 2015.

(51) Int. Cl.
 *H04L 29/06* (2006.01)
 *H04L 12/26* (2006.01)
 *G06F 7/02* (2006.01)

(52) U.S. Cl.
 CPC ............ *H04L 65/4069* (2013.01); *G06F 7/02* (2013.01); *H04L 43/08* (2013.01); *H04L 43/50* (2013.01)

(58) Field of Classification Search
 CPC ....... H04L 43/50; H04L 43/062; H04L 43/08; H04L 65/4069; G06F 7/02

(Continued)

(56) References Cited

U.S. PATENT DOCUMENTS 5,339,257 A * 8/1994 Layden .............. G05B 19/4184
                                                       700/174
7,657,503 B1 * 2/2010 Cormode .............. H04L 43/026
                                                       707/999.002

(Continued)

OTHER PUBLICATIONS

Boersma et al., "The POWER7 Binary Floating-Point Unit", 2011 20th IEEE Symposium on Computer Arithmetic, © 2011 IEEE, DOI 10.1109/ARITH.2011.21, pp. 87-91.
"Apache Storm", Storm, distributed and fault-tolerant realtime computation, Copyright © 2014 Apache Software Foundation, printed on May 4, 2015, pp. 1-2, <http://storm.apache.org/>.
"Kahan summation algorithm", From Wikipedia, the free encyclopedia, this page was last modified on Dec. 27, 2014, at 23:00, pp. 1-6, <http://en.wikipedia.org/wiki/Kahan_summation_algorithm>.

(Continued)

*Primary Examiner* — Michael C Lai
(74) *Attorney, Agent, or Firm* — Gilbert Harmon, Jr.

(57) ABSTRACT

A method for analyzing streaming data includes providing a streaming accumulator comprising an addition module and two multiplexers, receiving one or more data streams, continuously calculating a set of basic statistical elements, receiving a request to calculate a set of statistical descriptors, calculating the set of statistical descriptors, and providing the set of statistical descriptors. An apparatus for analyzing streaming data includes a first multiplexer configured to receive a first summation, a second summation, and a current data item, and forward the first summation on cycles 1 and 3, forward the second summation on cycle 4, and forward the current data item on cycle 2, a second multiplexer configured to receiver the second summation, a third summation, and a previous data item, and forward the previous data item on cycles 1 and 3, forward the second summation on cycle 4, and forward the third summation on cycle 2.

6 Claims, 8 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 7,868,886 | B2* | 1/2011 | Ackermans | G06T 11/206 345/440 |
| 8,045,470 | B2* | 10/2011 | Zseby | H04L 41/142 370/235 |
| 8,310,922 | B2* | 11/2012 | Nelson | H04L 43/18 370/229 |
| 8,488,661 | B2* | 7/2013 | Menon | H04L 43/026 370/232 |
| 2012/0271748 | A1* | 10/2012 | DiSalvo | G06Q 40/04 705/37 |
| 2013/0254345 | A1* | 9/2013 | Kook | H04N 21/23805 709/219 |

OTHER PUBLICATIONS

"Real-Time Solutions", Quantfeedhandler, S&P Capital IQ Real-Time Solutions (QuantHouse) © 2009-2015, p. 1, <http://www.quanthouse.com/feedhandler>.

"TIBCO Live Datamart—Overview", TIBCO®, Copyright © 2015 TIBCO Software, Inc., pp. 1-4, <http://www.tibco.com//products/event-processing/complex-event-processing/streambase-liveview?doing_wp_cron=140492654>.

Banjeree et al, "Real-Time Statistical Analysis on High Speed Streaming Data", U.S Appl. No. 14/868,495, filed Sep. 29, 2015, 32 pages.

IBM Appendix P, list of patents and patent applications treated as related, Jul. 20, 2019, 2 pages.

* cited by examiner

| Cycle | Input | Output |
|---|---|---|
| 1 | 0+1 | zero |
| 2 | zero | zero |
| 3 | 2+3 | zero |
| 4 | zero | zero |
| 5 | 4+5 | 0+1 |
| 6 | zero | zero |
| 7 | 6+7 | 2+3 |
| 8 | 0-3 | zero |
| 9 | 8+9 | 4+5 |
| 10 | zero | zero |
| 11 | 10+11 | 6+7 |
| 12 | 4-7 | 0-3 |
| 13 | 12+13 | 8+9 |
| 14 | 0-3 | zero |
| 15 | 14+15 | 10+11 |
| 16 | 8-11 | 4-7 |
| 17 | 16+17 | 12+13 |
| 18 | 0-7 | 0-3 |
| 19 | 18+19 | 14+15 |
| 20 | 12-15 | 8-11 |
| 21 | 20+21 | 16+17 |
| 22 | 0-11 | 0-7 |
| 23 | 22+23 | 18+19 |
| 24 | 16-19 | 12-15 |
| 25 | 24+25 | 20+21 |
| 26 | 0-15 | 0-11 |
| 27 | 26+27 | 22+23 |
| 28 | 20-23 | 16-19 |
| 29 | 28+29 | 24+25 |
| 30 | 0-19 | 0-15 |
| 31 | 30+31 | 26+27 |
| 32 | 24-27 | 20-23 |

US 10,097,600 B2

REAL-TIME STATISTICAL ANALYSIS ON HIGH SPEED STREAMING DATA

BACKGROUND OF THE INVENTION

The present invention relates generally to the field of data processing, and more particularly to statistical analysis on streaming data.

Data processing can provide a multitude of insights to a company or individual looking to improve on a part of their business or a process they execute. In particular, statistical analysis on a set of data can reveal inconsistencies in the data. For example, a frequency distribution can serve as a measure of consistency; a frequency distribution that is mostly clustered in one spot can reveal a process or product is providing reliable results, where a frequency distribution that is widespread could indicate a flaw. Even simpler statistics such as a minimum and a maximum can provide critical information. If a process needs to be completed in a specific amount of time, the maximum indicates whether or not the process is being completed quickly enough each time it is executed. These statistical characteristics, along with others, can provide a manageable summary of an otherwise unmanageably large set of data. The present application is a continuation of application Ser. No. 14/868,495, filed on Sep. 29, 2015.

SUMMARY

As disclosed herein, a method for analyzing streaming data includes providing a streaming accumulator comprising at least an addition module, and two multiplexers, receiving one or more data streams comprising one or more sets of data items, continuously calculating a set of basic statistical elements corresponding to the one or more sets of data items, receiving a request to calculate a set of statistical descriptors corresponding to the one or more data streams, calculating the set of statistical descriptors corresponding to the one or more data streams, and providing the set of statistical descriptors to a user.

Also disclosed herein, an apparatus for analyzing streaming data includes a first multiplexer configured to receive a first summation, a second summation, and a current data item, and forward the first summation on cycles 1 and 3, forward the second summation on cycle 4, and forward the current data item on cycle 2, a second multiplexer configured to receiver the second summation, a third summation, and a previous data item, and forward the previous data item on cycles 1 and 3, forward the second summation on cycle 4, and forward the third summation on cycle 2, and an addition module configured to receive and add data items forwarded from the first multiplexer and the second multiplexer to provide a current summation result.

DETAILED DESCRIPTION

The amount of data available has grown exponentially over the past few years. Concepts such as MapReduce and Hadoop have enabled massive amounts of data to be processed. With streaming data becoming more and more available in real-time, the ability to analyze the data with minimal latency to get "live" results provides a number of benefits, particularly in fields such as statistical arbitrage and risk assessment. The method disclosed herein may enable real-time computation of statistical characteristics for a streaming rate of up to 5.5 GHz with a latency of only 39 clock cycles.

Figure 1:
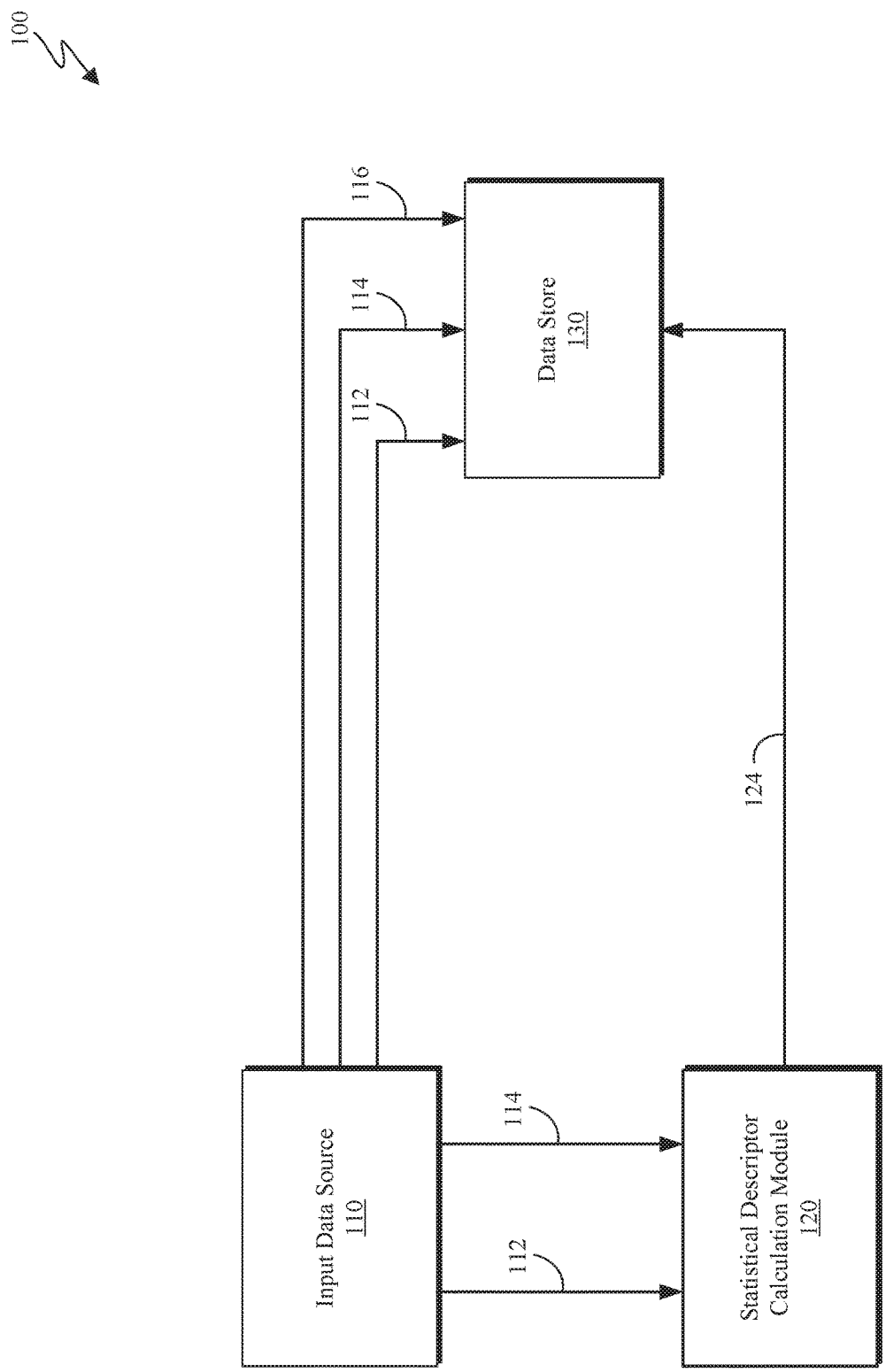
FIG. 1 is a functional block diagram depicting a streaming data processing system in accordance with some embodiments of the present invention.

FIG. 1 is a dataflow diagram depicting a data processing system 100 in accordance with some embodiments of the present invention. As depicted, data processing system 100 includes an input data source 110, a statistical descriptor calculation module 120, and a data store 130. Data processing system 100 is an example of a system which may enable real-time statistical analysis on high speed streaming data.

Input data source 110 may be a module or system capable of providing data at or near real-time. In the depicted embodiment, input data source 110 provides a dataset 112, a clock signal 114, and a control signal 116. Data set 112, also referred to as $X_i$, may comprise data to be analyzed via statistic descriptor calculation module 120. Data set 112 may contain data corresponding to any number of fields, such as stock market analysis, manufacturing process analysis, chemical process analysis, or environmental data analysis. In one embodiment, dataset 112 comprises streaming data with a streaming rate greater than 5.0 Ghz. Clock signal 114 may be used to evaluate the duration of a process, or to synchronize process within data processing environment 100.

Statistical descriptor calculation module 120 may be a combination of hardware components configured to calculate a plurality of statistical descriptors. In one embodiment, statistical descriptor calculation module 120 is configured to calculate a running summation of data set 112 ($\Sigma Xi$), a square running summation of data set 112 ($\Sigma Xi^2$), frequency distribution, median, minimum, maximum, and range. Specific embodiments of hardware components included in statistical descriptor calculation module 120 are depicted in FIG. 2, FIG. 3, FIG. 4, and FIG. 5.

Data store 130 may be configured to store statistical descriptors as calculated by statistical descriptor calculator 120, as well as data received from input data source 110. Data store 130 may be any non-volatile storage media known in the art. For example, data store 130 can be implemented with a tape library, optical library, one or more independent hard disk drives, or multiple hard disk drives in a redundant array of independent disks (RAID). Similarly, data on data store 130 may conform to any suitable storage architecture known in the art, such as a file, a relational database, an object-oriented database, and/or one or more tables.

Figure 2:
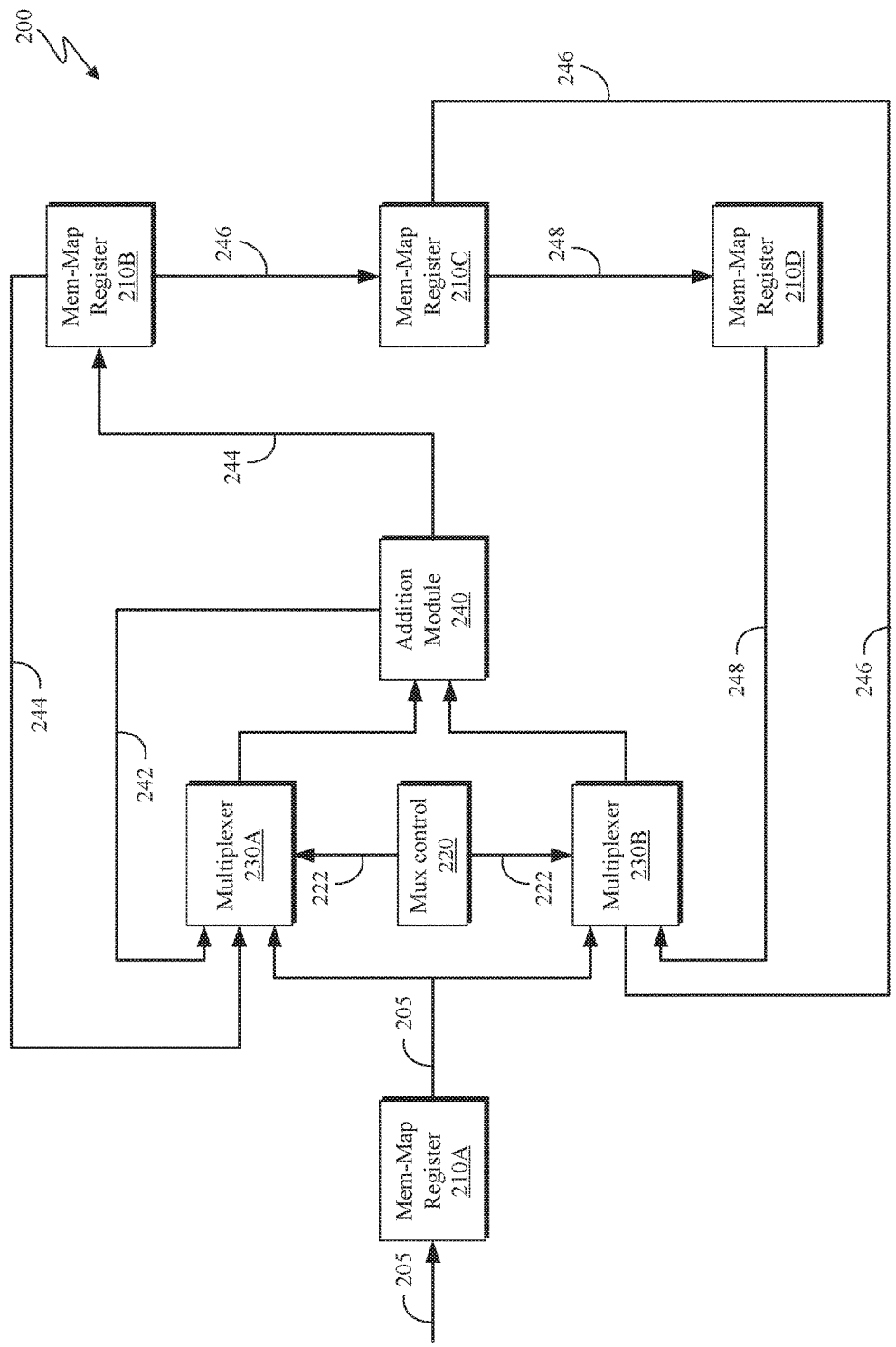
FIG. 2 is a data flow diagram depicting one example a streaming accumulator in accordance with some embodiments of the present invention.

FIG. 2 is a data flow diagram depicting one example a streaming accumulator 200 in accordance with some embodiments of the present invention. As depicted, streaming accumulator 200 includes memory-mapped registers 210A, 210B, 210C, and 210D, multiplexer control 220, multiplexers 230A and 230B, and an addition module 240. The streaming accumulator 200 may compute the real time running summation of the input data with a 39 clock latency. In one embodiment, streaming accumulator 200 uses an existing pipelined adder as a basic unit for addition.

Memory mapped register 210A may be configured to store received data 205. Memory mapped registers 210B, 210C, and 210D may be registers configured to store results as calculated by addition module 240. Memory-mapped registers 210B, 210C, and 210D make summation results 244, 246, and 248 as calculated by addition module 240 available to be queried at any time. Memory-mapped registers 210B, 210C, and 210D are configured to store the summation results from the three most recent iterations at any given time. In the depicted embodiment, at any given time, memory-mapped register 210B contains the summation result 244 for the most recent iteration, memory-mapped register 210C contains the summation result 246 for the second-most recent iteration, and memory-mapped register 210C contains the summation result 248 for the third most recent iteration. Memory-mapped register 210A makes data input item available to be queried at any time.

Multiplexer control 220 may be configured to monitor dataflow into streaming accumulator 200. In some embodiments, multiplexer control 200 is further configured to provide a signal to multiplexer 230A and multiplexer 230B indicating which data items should be passed through. In the depicted embodiment, multiplexer control 220 gives commands based on cycles of four iterations. Every odd iteration (i.e. $1^{st}$ and $3^{rd}$ iterations where a cycle is 4 iterations), multiplexer control 220 sends a signal to multiplexer 230A and multiplexer 230B to select a first data item. Every 2nd iteration, multiplexer control 220 sends a signal to multiplexer 230A and multiplexer 230B to select a second data item. Every 3rd iteration, multiplexer control 220 sends a signal to multiplexer 230A and multiplexer 230B to select a third data item.

Multiplexers 230A and 230B may be configured to select one of several input signals and forwards the selected input into a single line. In the depicted embodiment, multiplexer 230A is configured to receive summation results 242 and 244 along with data item 205. Also in the depicted embodiment, multiplexer 230B is configured to receive summation results 246 and 248 along with data item 205. Based on the signal 220 received from multiplexer control 220, multiplexer 230A may pass along either summation result 242, summation result 244, or data item 205. Based on the signal 220 received from multiplexer control 220, multiplexer 230B may pass along either summation result 246, summation result 248, or data item 205.

Figure 3:
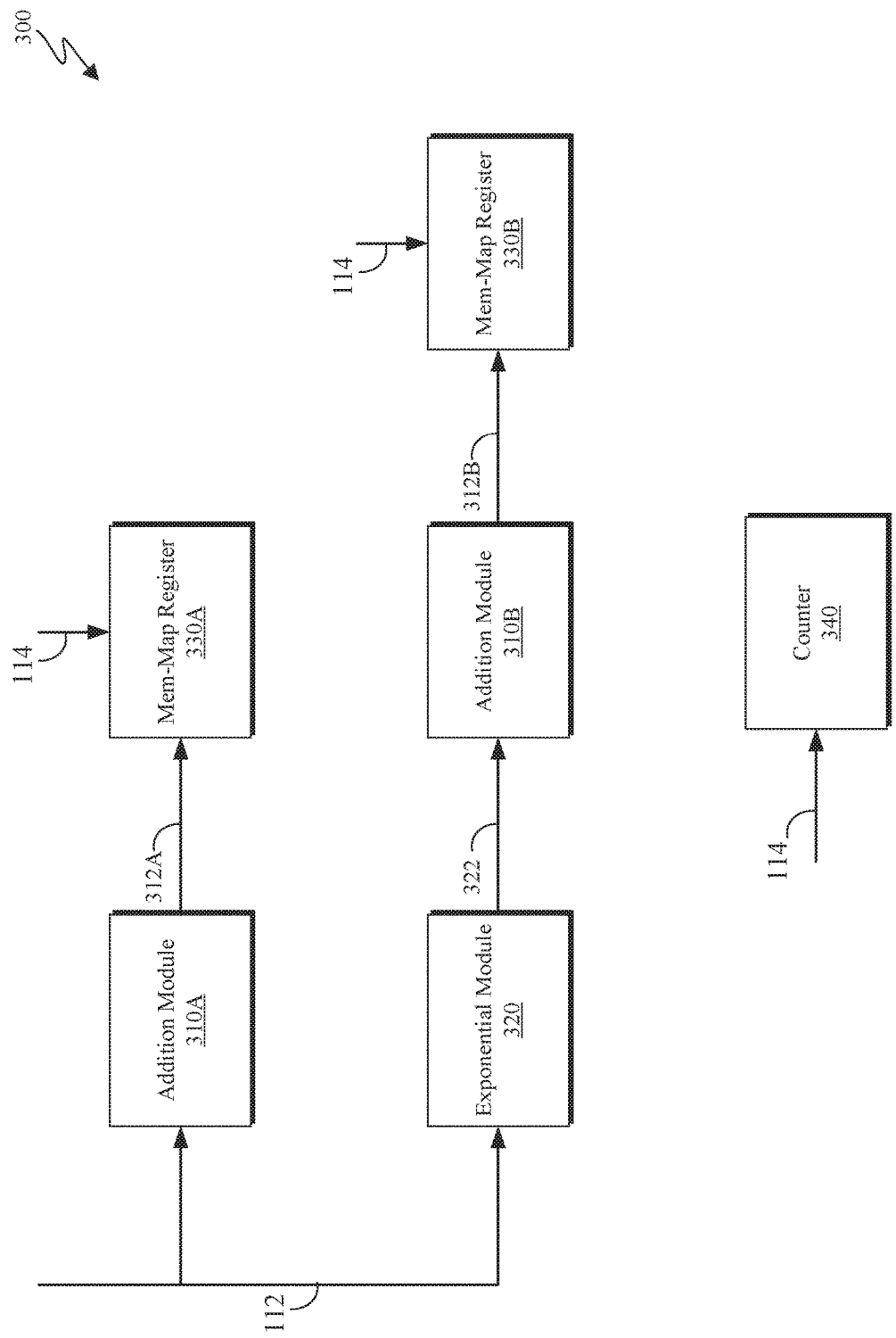
FIG. 3 is a dataflow diagram depicting a mean and variance calculator in accordance with some embodiments of the present invention.

FIG. 3 is a dataflow diagram depicting a mean and variance calculator 300 in accordance with some embodiments of the present invention. As depicted, mean and variance calculator 300 includes addition modules 310A and 310B, an exponential module 320, memory-mapped registers 330A and 330B, and a counter 340. Mean and variance calculator 300 is a set of hardware components configured to calculate the mean and variance of a set of data received from an input data source.

Addition modules 310A and 310B may be configured to receive a dataset. In the depicted embodiment, addition module 310A is configured to receive dataset 112 from an input data source, and addition module 310B is configured to receive squared dataset 322 from exponential module 320. Upon receiving the datasets, addition modules 310A and 310B are configured to calculate the sum of the received data. Summation results 312A and 312B are then provided to memory-mapped registers 330A and 330B, respectively.

Exponential module 320 may be configured to receive a dataset. In the depicted embodiment, exponential module 320 is configured to receive dataset 112 from an input data source. Upon receiving the dataset, exponential module 320 is configured to square each item $X_i$ in the dataset 112. Squaring each item in the dataset provides a squared dataset 322, which may then be sent to addition module 310B.

Memory-mapped registers 330A and 330B may be registers configured to store results as calculated by addition modules 310A and 310B. Memory-mapped register 330A stores summation result 312A, while memory-mapped register 330B stores summation result 312B. Memory-mapped registers 330A and 330B make summation results 312A and 312B available to be queried at any time.

Counter 340 may be an additional memory-mapped register similar to memory-mapped registers 330A and 330B. Counter 340 is configured to receive clock signal 114 each time a new set of streaming data is received. Counter 340 effectively tracks the number of samples that have been received by mean and variance calculator 300.

Figure 4:
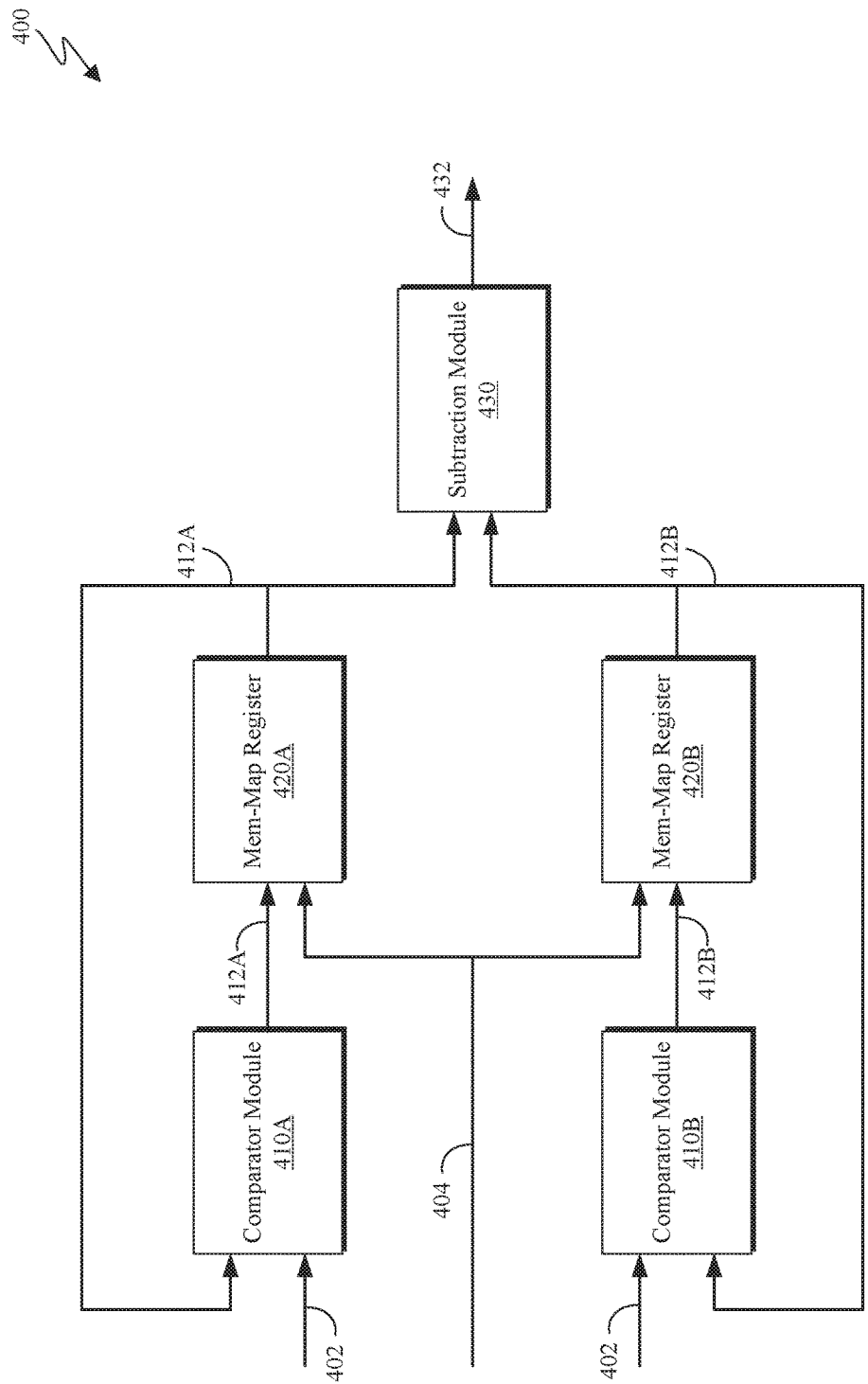
FIG. 4 is a dataflow diagram depicting a range calculator in accordance with some embodiments of the present invention.

FIG. 4 is a dataflow diagram depicting a range calculator 400 in accordance with some embodiments of the present invention. As depicted, range calculator 400 includes comparator modules 410A and 410B, memory-mapped register 420A and 420B, and subtraction module 430. Range calculator 400 may calculate the range associated with a received dataset along with the minimum and maximum data items in the dataset.

Comparator modules 410A and 410B may be configured to receive and compare input items. In one embodiment, comparator modules 410A and 410B are configured to first receive two input items and compare them. Comparator module 410A is configured to determine which input item is larger, and comparator module 410B is configured to determine which input item is smaller. Comparator module 410A may be configured to send the larger of the two compared items, called current maximum 412A, to memory-mapped register 420A. Similarly, comparator module 410B may be configured to send the smaller of the two compared items, called the current minimum 412B, to memory-mapped register 420B.

Memory-mapped registers 420A and 420B may be registers configured to store results as calculated by comparator modules 410A and 410B. Memory-mapped register 420A stores current maximum 412A, while memory-mapped register 420B stores current minimum 412B. Memory-mapped registers 420A and 420B make current maximum 412A and current minimum 412B available to be queried at any time.

Subtraction module 430 may be configured to receive current maximum 412A and current minimum 412B. In one embodiment, subtraction module 430 is configured to subtract current minimum 412B from current maximum 412A to provide a current range 432 corresponding to the dataset. The range of the dataset may be used to calculate a frequency distribution.

Figure 5:
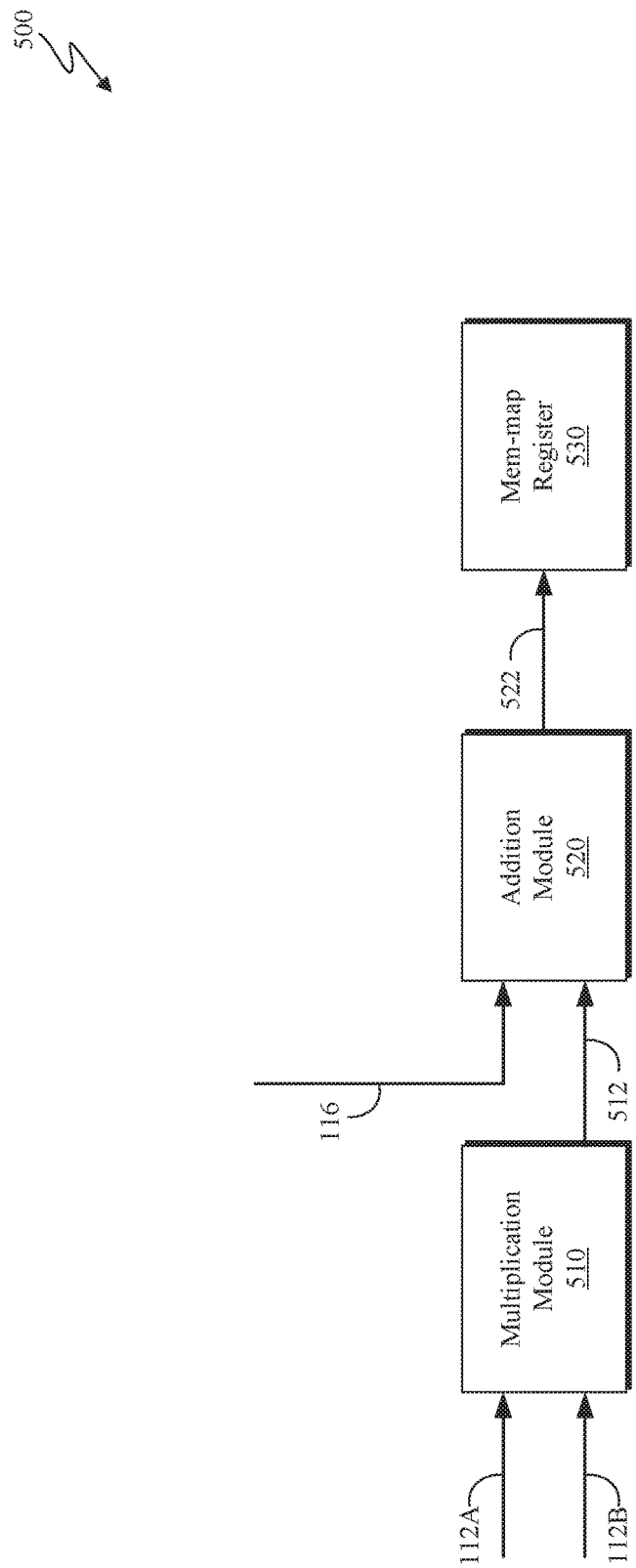
FIG. 5 is a dataflow diagram depicting a covariance calculator in accordance with some embodiments of the present invention.

FIG. 5 is a dataflow diagram depicting a covariance calculator 500 in accordance with some embodiments of the present invention. As depicted, covariance calculator 500 includes multiplication module 510, addition module 520, and memory-mapped register 530. Covariance calculator 500 may be used to calculate the covariance of two datasets stemming from two data streams.

Multiplication module 510 may be configured to receive two datasets 112A and 112B corresponding to two data streams. In one embodiment, multiplication module 510 is configured to multiply an element from dataset 112A by a corresponding element from dataset 112B to provide a set of products 512. The set of products 512 may be used indirectly to calculate the covariance.

Addition module 520 may be configured to receive a set of products 512. In one embodiment, addition module 520 is configured to add all the elements in the set of products 512 to provide a summation result 522. The summation result 522 may be utilized to calculate the covariance corresponding to datasets 112A and 112B. In one embodiment, the covariance of datasets 112A and 112B may be calculated according to the equation:

$$\text{Covariance}(X,Y)=(\Sigma(X_i*Y_i)/N-(\Sigma X_i/N)(\Sigma Y_i/N),$$

wherein $X_i$ corresponds to an element from a dataset such as dataset 112A, $Y_i$ corresponds to an element from a dataset such as dataset 112B, and N corresponds to the number of data items in datasets 112A and 112B.

Memory-mapped register 530 may be a register configured to store results as calculated by addition module 520. Memory-mapped register 530 stores summation result 522 and makes summation result 522 available to be queried at any time.

Figure 6:
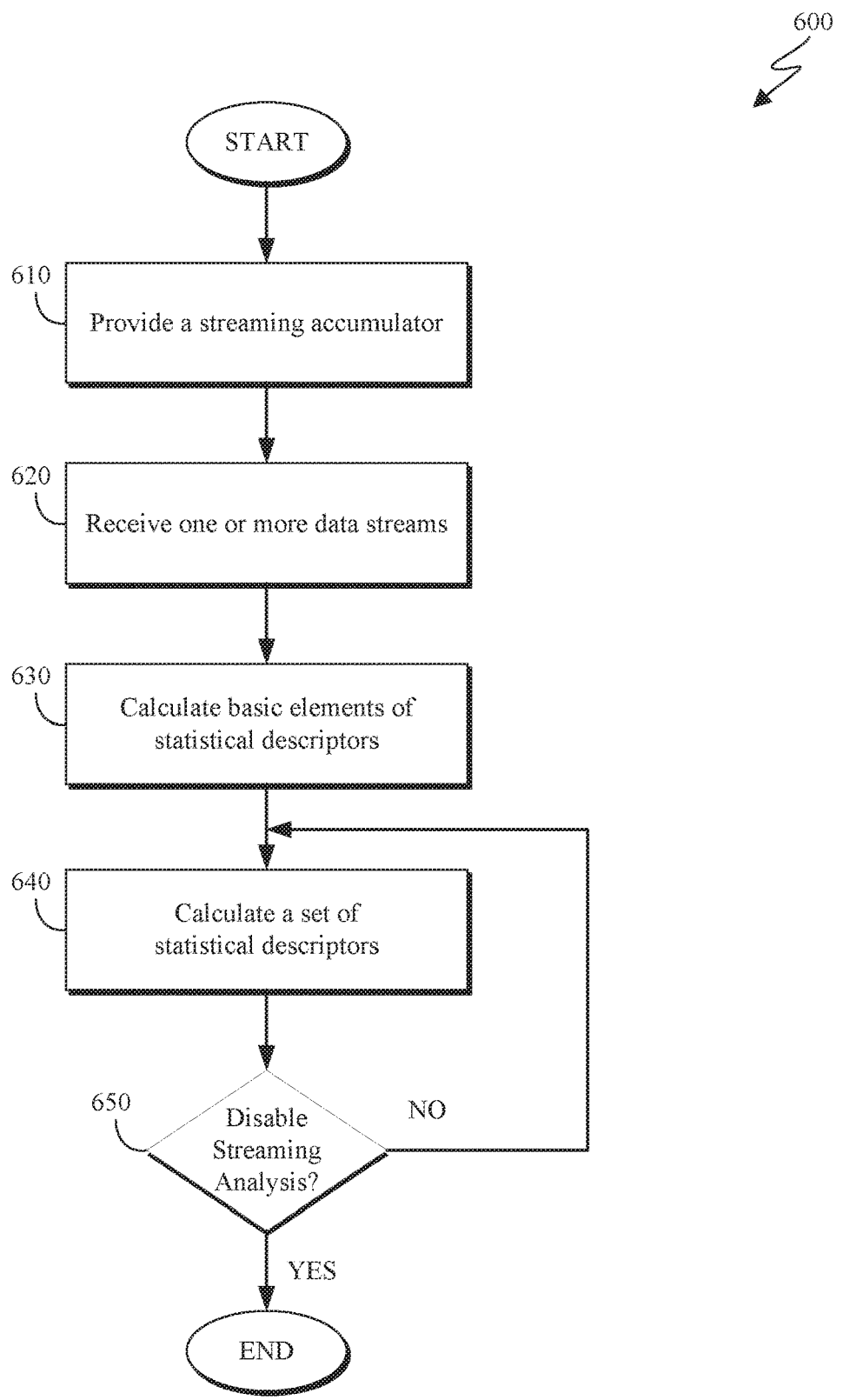
FIG. 6 is a flowchart depicting a streaming data analysis method in accordance with some embodiments of the present invention.

FIG. 6 is a flowchart depicting a streaming data analysis method 600. As depicted, streaming data analysis method 600 includes providing (610) a streaming accumulator, receiving (620) a data stream, calculating (630)) a set of basic statistical elements, computing (640) a set of statistical descriptors, and deciding (650) whether or not to disable streaming analysis. Streaming data analysis method 600 may enable essential characteristics of high speed streaming data to be analyzed.

Providing (610) a streaming accumulator may include providing a hardware module configured to calculate a set of basic statistical elements. In some embodiments, providing a streaming accumulator includes providing a hardware element such as the streaming accumulator 200 depicted and discussed with respect to FIG. 2.

Receiving (620) a data stream may include receiving a set of streaming data from an input data source. In one embodiment, multiple sets of data corresponding to multiple parallel data streams are received. In some embodiments, a clock signal and a control signal are received along with the data streams. The received data may be received by a plurality of hardware components simultaneously. Reception of the data may initiate calculating (630) a set of basic statistical elements.

Calculating (630) a set of basic statistical elements may include initiating hardware components to begin analyzing the streaming data. In one embodiment, streaming analysis may be enabled immediately responsive to approximating a minimum, maximum and a number of intervals for the frequency distribution. In another embodiment, streaming analysis may not be enabled until a predetermined number of samples have been streamed in. The set of basic statistical elements may include one or more of a minimum, a maximum, a summation of the data items, a product of the data items, and a number of received data items.

Calculating (640) a set of statistical descriptors may include utilizing hardware components to calculate a set of statistical descriptors. The set of statistical descriptors may include any of the sum of the data, the sum of the square of the data, mean, variance, median, and range. In an embodiment where multiple parallel data streams are received, the set of statistical descriptors may also include covariance and correlation of two of the multiple parallel data streams. The mean may be calculated according to the equation $\mu=\Sigma X_i/N$, where N is the number of samples and $X_i$, represents the received dataset. The variance may be calculated according to the equation $\text{Var}=\Sigma(X_i^2)/N-(\Sigma X_i/N)^2$.

Determining (650) whether or not to disable streaming analysis may include determining if streaming data is still being provided. If no more data is being streamed, the method terminates. If data is continuing to be streamed, then the method returns to calculating (640) a set of statistical descriptors. In some embodiments, the method may terminate if a predetermined number of samples have already been received. A user may provide said predetermined number of samples to indicate a number of samples at which point the statistics will be considered adequate and accurate.

Figure 7:
FIG. 7 depicts a table of sample addition module inputs and outputs in accordance with one embodiment of the present invention.

FIG. 7 depicts a table 700 of sample addition module inputs and outputs in accordance with one embodiment of the present invention. As depicted, table 700 includes 32 rows with each row corresponding to a single cycle of inputs and outputs corresponding to an addition module within a streaming accumulator. The first column indicates which cycle each row corresponds to. The second column, labeled "input", indicates what data items are received from multiplexers configured to feed the addition module. These data items were selected according to the selection cycle described with respect to multiplexers 230A and 230B in FIG. 2. The third column, labeled "Output", indicates the currently available output from the addition module with respect to each cycle.

In the depicted embodiment, the "Output" column corresponds to the "Input" column from four cycles prior. With respect to cycles 2, 4, 6, and 10, the input is depicted as "zero". Because the selection cycle that determines the input items is based on summation results from previous iterations, these input items may not exist until after a number of cycles have passed. In the depicted embodiment, cycle10 is the last cycle for which the input items correspond to unavailable summation results. Since the outputs depend on the inputs from 4 cycles prior, cycle 14 is the last cycle for which the output items correspond to unavailable summation results. Therefore, beginning in cycle 15, output items are readily available, hence for this embodiment the streaming accumulator may be said to have a latency of 15 clocks.

Figure 8:
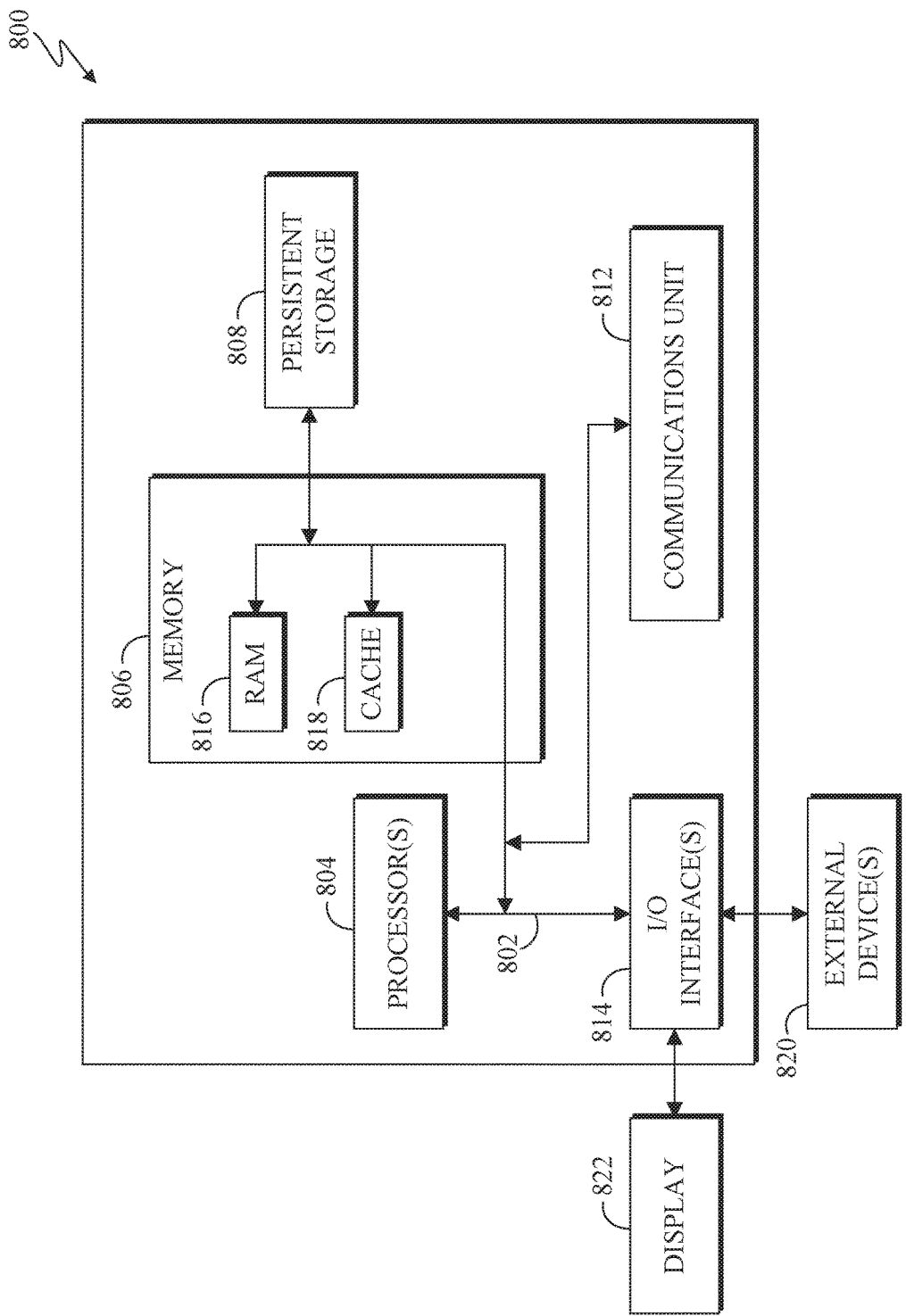
FIG. 8 is a functional block diagram depicting components of computer in accordance with an illustrative embodiment of the present invention.

FIG. 8 depicts a block diagram of components of computer 800 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

As depicted, the computer 800 includes communications fabric 802, which provides communications between computer processor(s) 804, memory 806, persistent storage 808, communications unit 812, and input/output (I/O) interface(s) 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 816 and cache memory 818. In general, memory 806 can include any suitable volatile or non-volatile computer-readable storage media.

One or more programs may be stored in persistent storage 808 for access and/or execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links.

I/O interface(s) 814 allows for input and output of data with other devices that may be connected to computer 800. For example, I/O interface 814 may provide a connection to external devices 820 such as a keyboard, keypad, a touch screen, and/or some other suitable input device. External devices 820 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 808 via I/O interface(s) 814. I/O interface(s) 814 also connect to a display 822.

Display 822 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   providing a streaming accumulator comprising at least an addition module, a first multiplexer, and a second multiplexer;
   receiving one or more sets of data items corresponding to one or more data streams;
   calculating, by the provided streaming accumulator, a set of basic statistical elements corresponding to the one or more sets of data items;
   determining whether additional data items corresponding to the one or more data streams are available;
   responsive to determining additional data items corresponding to the one or more data streams are available, updating the calculated set of basic statistical elements based on the additional data items;
   receiving a request to calculate a set of statistical descriptors corresponding to the one or more data streams;
   calculating the set of statistical descriptors according to the updated set of basic statistical elements; and
   providing the set of statistical descriptors to a user.

2. The method of claim 1, wherein the set of statistical descriptors includes one or more of a mean, a variance, a median, a frequency distribution, and a range.

3. The method of claim 1, wherein the set of statistical descriptors includes a covariance corresponding to two or more data items of the one or more sets of data items.

4. The method of claim 1, wherein the set of basic statistical elements includes one or more of a minimum, a maximum, a summation of the one or more sets of data items, a product of the data items, and a number of received data items.

5. The method of claim 1, wherein the set of basic statistical elements includes a summation of a product of two or more data items of the one or more sets of data items.

6. The method of claim 1, wherein providing the set of statistical descriptors to a user comprises communicating the set of statistical descriptors to a computing system to be processed.

* * * * *